(12) United States Patent
Stover (10) Patent No.: US 7,007,386 B1
(45) Date of Patent: Mar. 7, 2006

(54) LIGHT DUTY BEARING ASSEMBLY

(75) Inventor: John C. Stover, Allentown, NJ (US)

(73) Assignee: General Sullivan Group, Inc., West Trenton, NJ (US)

( * ) Notice: Subject to any disclaimer, the term of this patent is extended or adjusted under 35 U.S.C. 154(b) by 302 days.

(21) Appl. No.: 10/326,770

(22) Filed: Dec. 20, 2002

(51) Int. Cl.
*B21D 53/10* (2006.01)

(52) U.S. Cl. .................................. 29/898.07; 384/535

(58) Field of Classification Search ........... 384/898.07, 384/535, 581, 536, 582
See application file for complete search history.

(56) References Cited

U.S. PATENT DOCUMENTS

| | | |
|---|---|---|
| 2,302,110 A | 11/1942 | Dow et al. |
| 2,897,026 A | 7/1959 | Haller et al. |
| 2,931,412 A | 4/1960 | Wing |
| 3,061,386 A | 10/1962 | Dix et al. |
| 3,142,887 A | 8/1964 | Hulck et al. |
| 3,145,547 A | 8/1964 | Lyons |
| 3,197,243 A | 7/1965 | Brenneke |
| 3,424,287 A | 1/1969 | Dreiding |
| 3,494,676 A | 2/1970 | Compton |
| 3,541,810 A | 11/1970 | Kendall |
| 3,700,271 A | 10/1972 | Blaurock et al. |
| 3,776,653 A | 12/1973 | Buzogany |
| 3,838,928 A | 10/1974 | Blaurock et al. |
| 3,990,141 A | 11/1976 | Stark |
| 4,103,516 A | 8/1978 | Marcin |
| 4,222,246 A | 9/1980 | Rongley |
| 4,222,310 A | 9/1980 | Garrett et al. |
| 4,286,894 A | 9/1981 | Rongley |
| 4,367,053 A | 1/1983 | Stratienko et al. |
| 4,376,254 A | 3/1983 | Hellmann |
| 4,569,614 A | 2/1986 | Yamauchi |
| 4,636,106 A | 1/1987 | Waisbrod |
| 4,646,897 A | 3/1987 | Winters |
| 4,790,683 A | 12/1988 | Cramer, Jr. et al. |
| 4,828,423 A | 5/1989 | Cramer, Jr. et al. |
| 4,898,523 A | 2/1990 | Harwath |
| 4,979,834 A | 12/1990 | Speich |
| 4,981,390 A | 1/1991 | Cramer, Jr. et al. |
| 5,002,404 A | 3/1991 | Zernickel et al. |
| 5,014,999 A | 5/1991 | Makhobey |
| 5,062,721 A | 11/1991 | Chiba |
| 5,062,761 A | 11/1991 | Glachet |
| 5,079,977 A | 1/1992 | Petrie |
| 5,122,099 A | 6/1992 | Boedo et al. |
| 5,125,755 A | 6/1992 | Adler et al. |
| 5,127,218 A | 7/1992 | Schiesser et al. |
| 5,193,917 A | 3/1993 | Adler et al. |

(Continued)

Primary Examiner—Lenard A. Footland
(74) Attorney, Agent, or Firm—Sperry, Zoda & Kane (57) ABSTRACT

A method for mounting a light duty bearing having a groove defined in an outer arcuate surface thereof for receiving a metallic tolerance ring placed therein which includes protruding waves extending radially outwardly from the groove while the main band of the bearing is positioned preferably completely within the groove such that the bearing can be placed into a workpiece aperture to be movably mounted therein in a frictionally resisted manner such as required in light-duty applications where slight restricted movement between the bearing and the mounting aperture of the workpiece is desirable. The bearing assembly can be mounted in the workpiece aperture by exerting axial force against the inner race member or the outer race member to achieve the frictionally resisted mounting therebetween. The groove defined in the outer portion of the bearing is designed to receive and retain the tolerance ring therein during mounting in the workpiece aperture for greatly facilitating mounting.

15 Claims, 3 Drawing Sheets

U.S. PATENT DOCUMENTS

| | | |
|---|---|---|
| 5,248,214 A | 9/1993 | Duffy et al. |
| 5,304,594 A | 4/1994 | Saitou |
| 5,315,465 A | 5/1994 | Blanks |
| 5,336,013 A | 8/1994 | Duffy et al. |
| 5,353,566 A | 10/1994 | Boon et al. |
| 5,412,967 A | 5/1995 | Ishihara |
| 5,421,684 A | 6/1995 | Kluemper |
| 5,439,298 A | 8/1995 | Zernickel et al. |
| 5,472,470 A | 12/1995 | Kormanyos et al. |
| 5,496,216 A | 3/1996 | Rohrle et al. |
| 5,509,667 A | 4/1996 | Klein et al. |
| 5,524,343 A | 6/1996 | Blanks |
| 5,539,597 A | 7/1996 | Blanks |
| 5,607,023 A | 3/1997 | Palm |
| 5,611,416 A | 3/1997 | Berger et al. |
| 5,626,215 A | 5/1997 | Berger et al. |
| 5,632,562 A | 5/1997 | Kidzun et al. |
| D380,959 S | 7/1997 | Mitchell |
| 5,664,806 A | 9/1997 | Vortmeyer et al. |
| 5,718,131 A | 2/1998 | Bobbitt, III |
| 5,754,372 A | 5/1998 | Ramsdell et al. |
| 5,794,476 A | 8/1998 | Smietanski |
| 5,819,871 A | 10/1998 | Takaoka |
| 5,826,987 A | 10/1998 | Beaman |
| 5,829,891 A | 11/1998 | Beaman |
| 5,839,835 A | 11/1998 | Zernickel et al. |
| 5,931,585 A | 8/1999 | Malchow et al. |
| 5,937,500 A | 8/1999 | Bobbitt, III |
| 6,062,736 A | 5/2000 | Zernickel |
| 6,163,441 A | 12/2000 | Wood et al. |
| 6,179,473 B1 | 1/2001 | Ponson et al. |
| 6,261,061 B1 | 7/2001 | Pfaffenberger |
| 6,269,709 B1 | 8/2001 | Sangret |
| 6,288,878 B1 | 9/2001 | Misso et al. |
| 6,288,879 B1 | 9/2001 | Misso et al. |
| 6,318,232 B1 | 11/2001 | Lemke et al. |
| 6,318,900 B1 | 11/2001 | Bere et al. |
| 6,333,839 B1 | 12/2001 | Misso et al. |
| 6,347,462 B1 | 2/2002 | Steinich |
| 6,348,000 B1 | 2/2002 | Cooke et al. |
| 6,375,360 B1 | 4/2002 | Weisskopf et al. |
| 6,375,574 B1 | 4/2002 | Young et al. |
| 6,378,678 B1 | 4/2002 | Armitage et al. |
| 6,411,472 B1 | 6/2002 | Allsup |
| 6,416,229 B1 | 7/2002 | Wolf |
| 6,424,066 B1 | 7/2002 | Watson et al. |
| 6,430,836 B1 | 8/2002 | Steinich |
| 6,448,679 B1 | 9/2002 | Imlach |
| 2001/0002630 A1 | 6/2001 | Watanabe et al. |

LIGHT DUTY BEARING ASSEMBLY

BACKGROUND OF THE INVENTION

1. Field of the Invention

The present invention deals with the field of tolerance rings and in particular bearings used with such tolerance rings positioned about the outer circumference thereof to facilitate positioning of such bearings with respect to an outer workpiece in light duty applications where some slight movement axially of the bearing within the mounting aperture of the workpiece is desirable. Normally such a workpiece would define and opening or aperture therein in which the outer race of the bearing is mountable. The present invention provides a unique means for mounting of such bearing assemblies within a workpiece utilizing a tolerance ring positionable to be captured within a groove in the outer portion of the bearing to be retained therewithin which greatly facilitates insertion of the bearing assembly into the mounted position within the aperture defined in the workpiece. Such insertion can be performed by exerting axially directed force against the outer race as is the more standard practice or can be achieved by exerting axial force against the inner race which is a unique advantage of the assembly and method of the present invention.

2. Description of the Prior Art

Numerous patents have been designed and utilized with various bearing assembly methods and configurations usually having inner and outer races rotatably movable relative to one another. Other similar configurations are also usable with the present invention as well as methods for mounting thereof. The present invention further pertains to tolerance rings for use with such bearings and as shown in U.S. Pat. No. 2,302,110 patented Nov. 17, 1942 to D. M. Dow et al and assigned to Air-Way Electric Appliance Corporation on an "Overload Release Clutch"; and U.S. Pat. No. 2,897,026 patented Jul. 28, 1959 to J. Haller et al and assigned to Halex Corporation on an "Expansion Compensating Sleeve Bearing Unit"; and U.S. Pat. No. 2,931,412 patented Apr. 5, 1960 to L. B. Wing on a "Corrugated Spring Steel Bushing"; and U.S. Pat. No. 3,061,386 patented Oct. 30, 1962 to W. Dix et al and assigned to Deutsche Star Kugelhalter, G.m.b.H. on "Tolerance Rings"; and U.S. Pat. No. 3,142,887 patented Aug. 4, 1964 to K. Hulck et al and assigned to Deutsche Star Kugelhalter G.m.b.H. on a "Method Of Making A Split Annular Tolerance Ring"; and U.S. Pat. No. 3,145,547 patented Aug. 25, 1964 to J. M. Lyons and assigned to Dana Corporation on an "Alignment Device"; and U.S. Pat. No. 3,197,243 patented Jul. 27, 1965 to A. M. Brenneke and assigned to Perfect Circle Corporation on an "Aligning And Locking Device"; and U.S. Pat. No. 3,424,287 patented Jan. 28, 1969 to A. S. Dreiding and assigned to BP Chemicals (U.K.) Limited on a "Yieldable Clutch"; and U.S. Pat. No. 3,494,676 patented Feb. 10, 1970 to J. B. S. Compton and assigned to Silentbloc Limited on "Pivotal Joint Assemblies"; and U.S. Pat. No. 3,541,810 patented Nov. 24, 1970 to G. A. Kendall and assigned to General Motors Corporation on a "Drive Transmitting Connection"; and U.S. Pat. No. 3,700,271 patented Oct. 24, 1972 to G. Blaurock et al and assigned to Deutsche Star Kugelhalter GmbH on a "Spacer Ring"; and U.S. Pat. No. 3,776,653 patented Dec. 4, 1973 to A. S. Buzogany and assigned to Roller Bearing Company of America on a "Corrugated Elastic Shim And Shaft And Hub"; and U.S. Pat. No. 3,838,928 patented Oct. 1, 1974 to G. Blaurock et al and assigned to Deutsche Star Kugelhalter G.m.b.H. on a "Spacer Ring"; and U.S. Pat. No. 3,990,141 patented Nov. 9, 1976 to W. H. Stark and assigned to General Electric Company on "Methods Of Making Dynamoelectric Machine Structures"; and U.S. Pat. No. 4,103,516 patented Aug. 1, 1978 to R. Marcin and assigned to Newcor, Inc. on a "Limited Torque Drive Roller"; and U.S. Pat. No. 4,222,246 patented Sep. 16, 1980 to R. A. Rongley and assigned to Roller Bearing Company of American on a "Slip Clutch"; and U.S. Pat. No. 4,222,310 patented Sep. 16, 1980 to W. H. Garrett et al and assigned to Eaton Corporation on a "Brake Actuator Fastener Assembly"; and U.S. Pat. No. 4,286,894 patented Sep. 1, 1981 to RF. A. Rongley and assigned to Roller Bearing Company of America on "Tolerance Rings"; and U.S. Pat. No. 4,367,053 patented Jan. 4, 1983 to A. Stratienko et al on a "Clamping Device"; and U.S. Pat. No. 4,376,254 patented Mar. 8, 1983 to J. V. Hellmann and assigned to General Motors Corporation on an "Annular Molded Article Secured To A Shaft"; and U.S. Pat. No. 4,569,614 patented Feb. 11, 1986 to Y. Yamauchi on a "Coupling"; and U.S. Pat. No. 4,636,106 patented Jan. 13, 1987 to N. Waisbrod and assigned to Tzora Furniture Industries Ltd. on a "Coaxial Joint"; and U.S. Pat. No. 4,646,897 patented Mar. 3, 1987 to J. J. Winters and assigned to Automotive Products plc on a "Friction Clutch For A Vehicle"; and U.S. Pat. No. 4,790,683 patented Dec. 13, 1988 to A. A. Cramer, Jr. et al on a "Tolerance Ring And Shim And Method Of Use"; and U.S. Pat. No. 4,828,423 patented May 9, 1989 to A. A. Cramer, Jr. on a "Tolerance Ring And Shim"; and U.S. Pat. No. 4,898,523 patented Feb. 6, 1990 to F. L. Harwath and assigned to Suntec Industries Incorporated on a "Gear Pump With Ring-Type Shaft Retainer"; and U.S. Pat. No. 4,979,834 patented Dec. 25, 1990 to G. A. Speich and assigned to The Torrington Company on "Shafts Mounted In Bearings"; and U.S. Pat. No. 4,981,390 patented Jan. 1, 1991 to A. A. Cramer, Jr. et al and assigned to The Ray Engineering Co., Ltd. on a "Tolerance Ring With Retaining Means"; and U.S. Pat. No. 5,002,404 patented Mar. 26, 1991 to A. Zernickel et al on "Radial Rolling Bearings"; and U.S. Pat. No. 5,014,999 patented May 14, 1991 to M. Makhobey and assigned to Car-Graph, Inc. on a "Pressure Enhanced Self Aligning Seal"; and U.S. Pat. No. 5,062,721 patented Nov. 5, 1991 to M. Chiba and assigned to Nippon Seiko Kabushiki Kaisha on a "Roller Bearing With Sleeve"; and U.S. Pat. No. 5,062,761 patented Nov. 5, 1991 to C. Glachet and assigned to Euritech on a "Telescopic Manipulation Arm"; and U.S. Pat. No. 5,079,977 patented to J. A. Petrie on Jan. 14, 1992 for "Retaining Ring Tools"; and U.S. Pat. No. 5,122,099 patented Jun. 16, 1992 to S. Boedo et al and assigned to Borg-Warner Automotive, Inc. on a "Two-Speed Planetary Friction Accessory Drive"; and U.S. Pat. No. 5,125,755 patented Jun. 30, 1992 to H. Adler et al and assigned to INA Walzlager Schaeffler KG on a "Polymeric Tolerance Ring"; and U.S. Pat. No. 5,127,218 patented Jul. 7, 1992 to M. Schlesser et al and assigned to Fag Kugelfischer Georg Schaefer on a "Damped Rotor Spindle"; and U.S. Pat. No. 5,193,917 patented Mar. 16, 1993 to H. Adler et al and assigned to INA Walziager Schaeffler KG on "Rolling Bearings For Steering Columns"; and U.S. Pat. No. 5,248, 214 patented Sep. 28, 1993 to P. E. Duffy et al and assigned to The Torrington Company on a "Separable Connecting Device For Steering Column"; and U.S. Pat. No. 5,304,594 patented Apr. 19, 1994 to K. Saitou and assigned to NSK Ltd. on a "Resin Composition For Resin-Banded Bearing"; and U.S. Pat. No. 5,315,465 patented May 24, 1994 to J. B. Blanks and assigned to Seagate Technology, Inc. on a "Compliant Pivot Mechanism For A Rotary Actuator"; and U.S. Pat. No. 5,336,013 patented Aug. 9, 1994 to P. E. Duffy et al and assigned to The Torrington Company on a "Separable Connecting Device For Steering Column"; and U.S. Pat. No. 5,353,566 patented Oct. 11, 1994 to A. J. Boon et al and assigned to NCR Corporation on a "Mounting Member To Eliminate Vibration And Electrostatic Discharges"; and U.S. Pat. No. 5,412,967 patented May 9, 1995 to T. Ishihara and assigned to Ishikawajima-Harima Heavy Industries Co., Ltd. on a "Method Of Making A Metallic Ring-Shaped Body"; and U.S. Pat. No. 5,421,684 patented Jun. 6, 1995 to S. T. Kluemper and assigned to General Motors Corporation on a "Vibration Damping Structure In A Bolted Assembly"; and U.S. Pat. No. 5,439,298 patented Aug. 8, 1995 to A. Zernickel et al and assigned to Ina Walzlager Schaeffler KG on a "Suspension Strut Bearing"; and U.S. Pat. No. 5,472,470 patented Dec. 5, 1995 to K. R. Kormanyos et al and assigned to Glasstech, Inc. on a "Glass Sheet Press Forming And Quenching Ring"; and U.S. Pat. No. 5,496,216 patented Mar. 5, 1996 to D. Rohrie and assigned to Valeo on a "Torsion Damper With Resilient Radial Acting Spring"; and U.S. Pat. No. 5,509,667 patented Apr. 23, 1996 to N. Klein et al and assigned to Firma Carl Freudenberg on a "Radial Lip Seal For A Shaft In A Housing"; and U.S. Pat. No. 5,524,343 patented Jun. 11, 1996 to J. B. Blanks and assigned to Seagate Technology, Inc. on a "Press-Fit Glueless Bearing Pivot Assembly"; and U.S. Pat. No. 5,539,597 patented Jul. 23, 1996 to J. B. Blanks and assigned to Seagate Technology, Inc. on a "Press-Fit Glueless Bearing Pivot Assembly For A Rotary Actuator"; and U.S. Pat. No. 5,544,330 patented Aug. 6, 1996 to D. S. Bither et al and assigned to EMC Corporation on a "Fault Tolerant Interconnect Topology Using Multiple Rings"; and U.S. Pat. No. 5,607,023 patented Mar. 4, 1997 to B. Palm and assigned to Milwaukee Electric Tool Corp. on an "Impact Absorption Mechanism For Power Tools"; and U.S. Pat. No. 5,611,416 patented Mar. 18, 1997 to A. H. Berger et al and assigned to Ford Motor Company on a "Speed Limiting Accessory Drive And Crankshaft Damper"; and U.S. Pat. No. 5,626,215 patented May 6, 1997 to A. H Berger et al and assigned to Ford Motor Company on a "Speed Limiting Accessory Drive"; and U.S. Pat. No. 5,632,562 patented May 27, 1997 to D. Kidzun et al and assigned to INA Walzlager Schaeffler KG on a "Bearing Assembly For Supporting A Shaft Without Play"; and U.S. Pat. No. 5,664,806 patented Sep. 9, 1997 to J. Vortmeyer et al and assigned to Lemforder Metallwaren AG on a "Crash System For The Steering Column In A Motor Vehicle"; and U.S. Pat. No. 5,718,131 patented Feb. 17, 1998 to J. T. Bobbitt, III and assigned to The Torrington Company on a "Steering Column Locking Assembly"; and U.S. Pat. No. 5,754,372 patented May 19, 1998 to R. G. Ramsdell et al and assigned to Quantum Corporation on an "Actuator Bearing Cartridge For Top Down Assembly"; and U.S. Pat. No. 5,794,476 patented Aug. 18, 1998 to R. A. Smietanski and assigned to Navistar International Transportation Corp. on a "Self-Aligning Flexible Gear Support For Auxiliary Gear Box"; and U.S. Pat. No. 5,819,871 patented Oct. 13, 1998 to M. Takaoka and assigned to Koyo Seiko Co., Ltd. on an "Electric Power Steering Device"; and U.S. Pat. No. 5,826,987 patented Oct. 27, 1998 to M. D. Beaman and assigned to The Torrington Company on a "Mounting Of A Shaft Within A Housing"; and U.S. Pat. No. 5,829,891 patented Nov. 3, 1998 to M. D. Beaman and assigned to The Torrington Company on a "Mounting For Steering Column"; and U.S. Pat. No. 5,839,835 patented Nov. 24, 1998 to A. Zernickel et al and assigned to Ina Walzlager Schaeffler KG on a "Self-Aligning Ball Bearing"; and U.S. Pat. No. 5,931,585 patented Aug. 3, 1999 to G. L. Malchow et al and assigned to Amana Company, L.P. on a "Bearing Mounting Structure With Reduced Dimensional Requirements"; and U.S. Pat. No. 5,937,500 patented Aug. 17, 1999 to J. T. Bobbitt, III and assigned to The Torrington Company on a "Method For Making A Steering Column Assembly"; and U.S. Pat. No. 6,062,736 patented May 16, 2000 to A. Zernickel and assigned to Ina Walzlager Schaeffler oHG on a "Pre-Tensioned Radial Rolling Bearing"; and U.S. Pat. No. 6,163,441 patented Dec. 19, 2000 to R. L. Wood et al and assigned to Seagate Technology LLC on a "Resonance Dampening Actuator Bearing Assembly"; and U.S. Pat. No. 6,179,473 patented Jan. 30, 2001 to F. Ponson et al and assigned to SKF France on a "Roller Bearing Of Steering Column For Motor Vehicles"; and United States Publication No. U.S. 2001/0002630 A1 published Jun. 7, 2001 to A. Watanabe et al on an "Electric Steering Apparatus"; and U.S. Pat. No. 6,261,061 patented Jul. 17, 2001 to E. E. Pfaffenberger and assigned to Rolls-Royce Corporation on a "Method And Apparatus For Mounting A Bearing"; and U.S. Pat. No. 6,269,709 patented Aug. 7, 2001 to H. C. Sangret and assigned to TRW Inc. on an "Apparatus For Automatic Control Of The Clearance Between Gears"; and U.S. Pat. No. 6,288,878 patented Sep. 11, 2001 to N. F. Misso et al and assigned to Seagate Technology LLC on a "Tolerance Ring With High Hoop Strength To Resist Deformation"; and U.S. Pat. No. 6,288,879 patented Sep. 11, 2001 to N. F. Misso et al and assigned Seagate Technology LLC on a "Top Down Assembly Of A Disk Drive Actuator Using A Tolerance Ring And A Post"; and U.S. Pat. No. 6,318,900 patented Nov. 20, 2001 to J. D. Bere et al and assigned to Siemens Automotive Inc. on a "Ball Bearing Mounting Member"; and U.S. Pat. No. 6,318,232 patented Nov. 20, 2001 to N. Lemke et al and assigned to Mercedes Benz Lenkungen GmbH on a "Pressure-Cutoff Arrangement For An Auxiliary Power Steering System In The End Positions Of The Steering Lock"; and U.S. Pat. No. 6,333,839 patented Dec. 25, 2001 to N. F. Misso et al and assigned to Seagate Technology LLC on a "Tolerance Ring With Low Consistent Installation Force Profile"; and U.S. Pat. No. 6,347,462 patented Feb. 19, 2002 to K. M. Steinich and assigned to ASM Automation Sensorik Messtechnik GmbH on a "Measuring Cable Travel Sensor With Housing"; and U.S. Pat. No. 6,348,000 patented Feb. 19, 2002 to r. D. Cooke et al and assigned to AP Time Limited on "Torsional Vibration Dampers"; and U.S. Pat. No. 6,375,360 patented Apr. 23, 2002 to U. Weisskopf et al and assigned to INA on a "Ball Bearing"; and U.S. Pat. No. 6,375,574 patented Apr. 23, 2002 to A. J. Young et al and assigned to AP TMF Limited on "Torsional Vibration Dampers"; and U.S. Pat. No. 6,378,678 patented Apr. 30, 2002 to B. Armitage et al and assigned to Automotive Products UK, LTD on "Twin Mass Flywheel Assemblies"; and U.S. Pat. No. 6,411,472 patented Jun. 25, 2002 to D. S. Allsup and assigned to Seagate Technology LLC on a "Dual Metal Laminate Tolerance Ring For Acoustic And Vibration Damping"; and U.S. Pat. No. 6,416,229 patented Jul. 9, 2002 to M. Wolf and assigned to INAS Walzlager Schaeffler oHG on a "Ball Bearing"; and U.S. Pat. No. 6,424,066 patented Jul. 23, 2002 to A. L. Watson et al and assigned to Camco International, Inc. on a "System For Reducing Wear And Improving Longevity Of A Electric Submergible Pumping System"; and U.S. Pat. No. 6,430,836 patented Aug. 13, 2002 to K. M. Steinich and assigned to ASM Automation Sensorik Messtechnic GmbH on a "Pull Element Travel Sensor"; and U.S. Pat. No. 6,448,679 patented Sep. 10, 2002 to J. Imlach on a "Passive Magnetic Support And Damping System"; and U.S. Design Pat. No. D380,959 patented Jul. 15, 1997 to C. A. Mitchell and assigned to The Torrington Company on a "Tolerance Ring".

SUMMARY OF THE INVENTION

The method of the present invention mounts or attaches a light duty bearing having a circumferential groove defined peripherally therearound into a workpiece aperture with a metallic tolerance ring retained within the groove. This tolerance ring retains the bearing in a frictionally resisted movable manner with respect to the workpiece aperture. The method usually includes providing a bearing with an inner race member which is rotatably mounted in an outer race member and includes an arcuate convex outer surface thereon. This outer arcuate convex surface is preferably of a generally cylindrical shape and will define a groove extending circumferentially therearound which is generally circular in shape.

A tolerance ring provided of a flexibly resilient metallic material which includes a main band section which is preferably ring-shaped. The tolerance ring preferably includes a plurality of wave sections extending radially outwardly therefrom. The tolerance ring also is preferably split laterally to define first and second longitudinal ends thereon. The main band section of the tolerance ring is preferably of a thickness which is less than the depth of the circumferential groove in order to facilitate retaining of the main band section completely within the circumferential groove whenever the tolerance ring is positioned therein.

In accordance with the method of the present invention, force is exerted on the tolerance ring to urge the first and second longitudinal ends apart to further open up the ring-shaped main band section. In this manner the tolerance ring can be moved to a position extending around and over the outer surface of the bearing and into the circumferential groove thereof with the wave protrusions extending radially outwardly from the groove. Normally the tolerance ring is simply expanded manually or automatically such as by machine and is then is positioned about the outer portion of the bearing in order to be allowed to snap into the groove which is defined between first and second circular rims which extend about the outer surface of the outer race of the bearing in order to define the groove therebetween. Since the tolerance ring is of a flexibly resilient metallic material, when placed in the groove and released it will return to the steady state configuration thereof in a position completely retained within the groove with only the wave protrusions extending outwardly therefrom radially.

The releasing of the force on the tolerance ring allows the first and second longitudinal ends thereof to resiliently move toward one another and thereby facilitates movement of the main band section to return to the steady state flexibly resilient configuration with the first and second longitudinal ends positioned adjacent to one another wherein the ring-shaped main band section is positioned within the groove. In this manner the main band section will be retained within the groove and the wave protrusions will extend radially outwardly therefrom. It is preferable that the wave protrusions be defined approximately perpendicular to the arcuate outer surface of the bearing. Also, preferably the wave protrusions are regularly positioned around the ring-shaped main band section thereof in order to maintain concentricity of the bearing with respect to the workpiece aperture.

Once the tolerance ring is positioned within the groove, the bearing will be urged or forced into the aperture of the workpiece manually or by mechanical automated means such as by pressing thereof. It is an important advantage of the present invention that the force for insertion of the bearing can be placed on either the outer race member of the bearing or on the inner race member thereof. The possibility of exerting the inserting pressing force against the inner race is an important advancement of the present invention. Normally such an process for bearing insertion is impossible due to the deforming of the balls or other rollers positioned between the inner and outer race of the bearings. Thus heretofore bearing insertion was performed by exerting the force on the outer race only. However, with the light duty movable mounting desired by the light duty bearing application of the present invention the pressing force can be exerted against either the inner or the outer race. The movable mounting of the assembly of the present invention is preferably frictionally resisted by the radially outward force of the waves of the tolerance rings directed against the interior wall of the workpiece aperture. Thus with those light duty applications for which is present assembly is useful, a frictionally resisted movable engagement between the workpiece and the bearing is desired such as for light duty equipment like vacuum cleaners.

When properly positioned within the workpiece aperture the outer arcuate surface of the bearing will abut the workpiece aperture with the tolerance ring positioned in the groove located therebetween. In this manner the tolerance ring will exert bias therebetween to facilitate securement therebetween. The level of securement achieved can vary widely. It can comprise severely restricted movable securement which limits any significant relative movement between the bearing and the aperture of the workpiece. Alternatively the engagement therebetween can be a frictionally restricted movable mounting which allows much relative movement of the outer surface of the bearing relative to the aperture of the workpiece. This type of mounting is often called a low-duty mounting since controlled limited frictionally engaged relative movement between the bearing and the mounting aperture of the workpiece is desirable.

In the preferred configuration the main band section of the tolerance ring is provided with a thickness such that it is less than the depth of the circumferential groove defined in the arcuate convex outer surface to facilitate retaining of the main band section completely within the circumferential groove responsive when the bearing is mounted within a workpiece. It is desirable to position the tolerance ring completely within the groove however sometimes it is necessary to compensate for slight dimensional variations in the size and shape of the tolerance ring or the surfaces to which it abuts in order to assure retainment thereof completely within the groove itself. As such, it is advantageous to provide the main band section of the tolerance ring with a thickness of between 0.005 inches and 0.010 inches less than the depth of the circumferential groove defined in the arcuate convex outer surface in order to be assured that the main band section thereof is completely retained within the groove regardless of slight variations in the dimensions or shape of the tolerance ring itself or of the surfaces against which it abuts.

When the main band section is positioned in the groove the two longitudinal ends of this tolerance ring can be positioned immediately adjacent to one another but spaced apart or, after placement in the groove, can be positioned in abutment with respect to one another. Either configuration will function properly in accordance with the method and product of the present invention.

The configuration of the bearing assembly of the present invention will include a bearing means with an outer body member having an arcuate convex outer surface which defines the groove therein. The outer body member of the bearing is movably mountable with respect to the aperture of the workpiece but this movement can be severely restricted by the frictional engagement therebetween caused by the tolerance ring held therebetween.

The tolerance ring is preferably formed of a main band means which is ring-shaped and is split laterally therealong. This lateral split defines a first end and a second end on the main band. These ends allow the flexibly resilient tolerance ring to be opened somewhat by separating of the ends to facilitate movement over the outer rims of the bearing outer arcuate surface to allow placement thereof into the groove. The tolerance ring also includes a plurality of protruding wave means which extend radially outwardly therefrom to facilitate engagement between the grooved surface of the outer bearing race and the surface of the workpiece inside of the aperture thereof.

It is an object of the present invention to provide a bearing assembly and method of insertion thereof into the aperture of a workpiece wherein the forces of insertion can be applied on the inner race member of the bearing.

It is an object of the present invention to provide a bearing assembly and method of insertion thereof into the aperture of a workpiece wherein the forces of insertion can be applied on the outer race member of the bearing.

It is an object of the present invention to provide a bearing assembly and method of insertion thereof into the aperture of a workpiece including a tolerance ring retained within a groove on the exterior surface of the bearing which can be easily assembled.

It is an object of the present invention to provide a bearing assembly and method of insertion thereof into the aperture of a workpiece including a tolerance ring retained within a groove on the exterior surface of the bearing which allows placement into the workpiece in a fast and efficient manner or operation due to the fact that the tolerance ring is captured within the groove.

It is an object of the present invention to provide a bearing assembly and method of insertion thereof into the aperture of a workpiece including a tolerance ring retained within a groove on the exterior surface of the bearing which can be made with a tolerance ring of flexibly resilient spring steel material.

It is an object of the present invention to provide a bearing assembly and method of insertion thereof which can be made with many different configurations of protruding waves extending radially outwardly from the tolerance ring of the bearing assembly to facilitate engagement with the workpiece aperture.

It is an object of the present invention to provide a bearing assembly and method of insertion thereof into the aperture of a workpiece including a tolerance ring retained within a groove on the exterior surface of the bearing which should include a plurality of regularly spaced protruding waves extending radially outward from the main band to maintain concentricity between the bearing and the workpiece aperture.

It is an object of the present invention to provide a bearing assembly and method of insertion thereof into the aperture of a workpiece including a tolerance ring retained within a groove on the exterior surface of the bearing which is easily maintained.

It is an object of the present invention to provide a bearing assembly and method of insertion thereof into the aperture of a workpiece including a tolerance ring retained within a groove on the exterior surface of the bearing which is relatively inexpensive for light-duty usage.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a bearing assembly 10 which is adapted to be placed into an aperture 14 defined in a workpiece 12 to provide low frictional rotational capability with respect thereto or fixed securement therebetween. Such a bearing assembly 10 normally includes an outer bearing race 38 which is mounted within the aperture 14 of workpiece 12 to minimize or restrict relative rotation therebetween. An inner bearing race 40 is mounted in such a manner as to be rotatably movable at a position within the outer bearing race 38. In this manner a workpiece mounted within the inner bearing race 40 will be capable of rotational freedom relative to the workpiece 12. This configuration is conventional bearing technology.

The present invention, however, includes a unique configuration for a light duty bearing assembly 10 which is mountable through a unique method to movably mount the bearing with respect to the workpiece aperture 14 utilizing a metallic tolerance ring 22 which has a main band section which is preferably ring-shaped. This mounting allows restricted relative movement between the bearing and the workpiece aperture which is resisted by frictional forces of the tolerance ring 22 positioned therebetween. Tolerance ring 22 is preferably positionable within a groove 16 which is preferably circular in shape and extends circumferentially about the outer body member 18 of the bearing 10. This groove 16 defined in the outer body member 18 is for the purpose of receiving the metallic ring-shaped tolerance ring 22 therein. This tolerance ring has the capability of selectively affixing the bearing assembly 10 with respect to the workpiece 12 and, in particular, the aperture 14 thereof.

One of the primary aspects of the present invention is in the unique method of mounting the bearing into the workpiece aperture with the metallic tolerance ring positioned about the exterior thereof. The inclusion of a circumferential groove in the outer bearing surface allows a uniquely advantageous method of insertion and can be used for many different types of bearing applications and greatly simplifies proper mounting of the bearing in the working location thereof within the aperture 14 of the workpiece 12.

Preferably the bearing assembly 10 includes an arcuate convex outer surface 20 which surface defines the groove 16 extending circumferentially therearound. In the preferred configuration the arcuate convex outer surface 20 is cylindrically shaped and includes a first rim means 42 extending therearound and a second rim means 44 extending therearound positioned spatially distant from the first rim means. In this manner the first rim means 42 and the second rim means 44 can define therebetween the groove means 16 which is preferably circular and extend circumferentially about the arcuate convex outer surface 20.

When so configured the bearing of the bearing assembly 10 will define this circumferential groove 16 which is adapted to receive the metallic ring-shaped tolerance ring 22 therewithin. This tolerance ring 22 preferably is ring-shaped with a lateral split 25 located extending laterally completely through the ring 22. The tolerance ring 22 includes a main band section 24 which terminates at a first end 26 and oppositely terminates at a second end 28. First end 26 and second end 28 define therebetween the lateral split 25.

Figure 1:
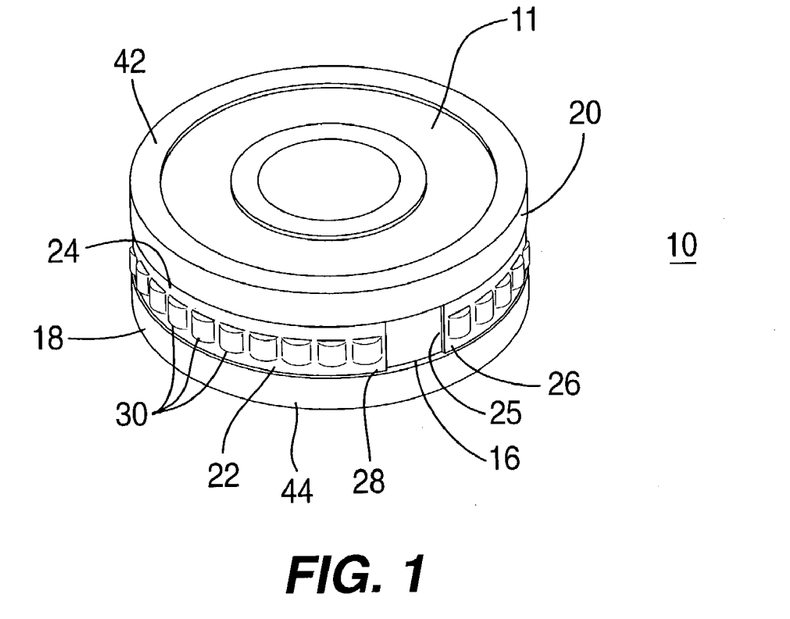
FIG. 1 is a front perspective illustration of an embodiment of the bearing assembly of the present invention.
Figure 2:
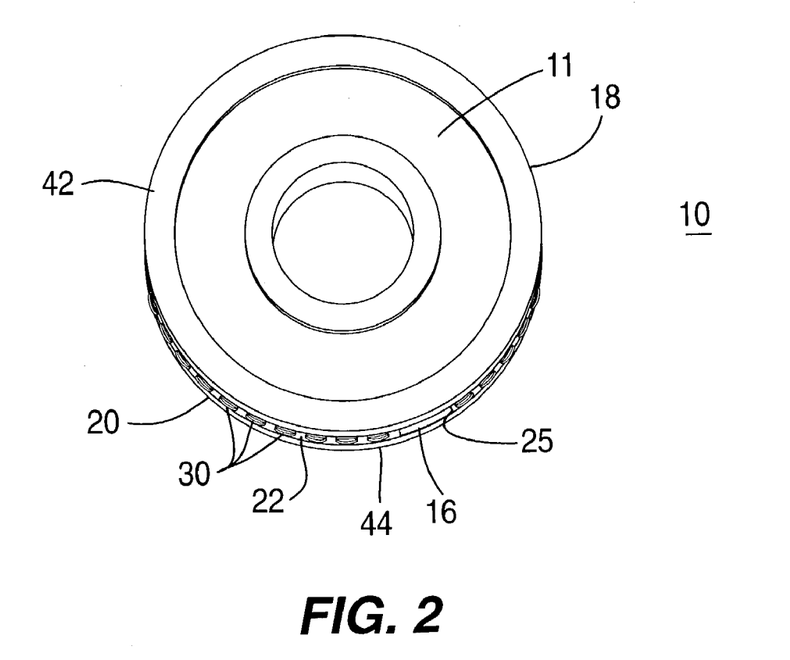
FIG. 2 is a side perspective illustration of the embodiment shown in FIG. 1.
Figure 3:
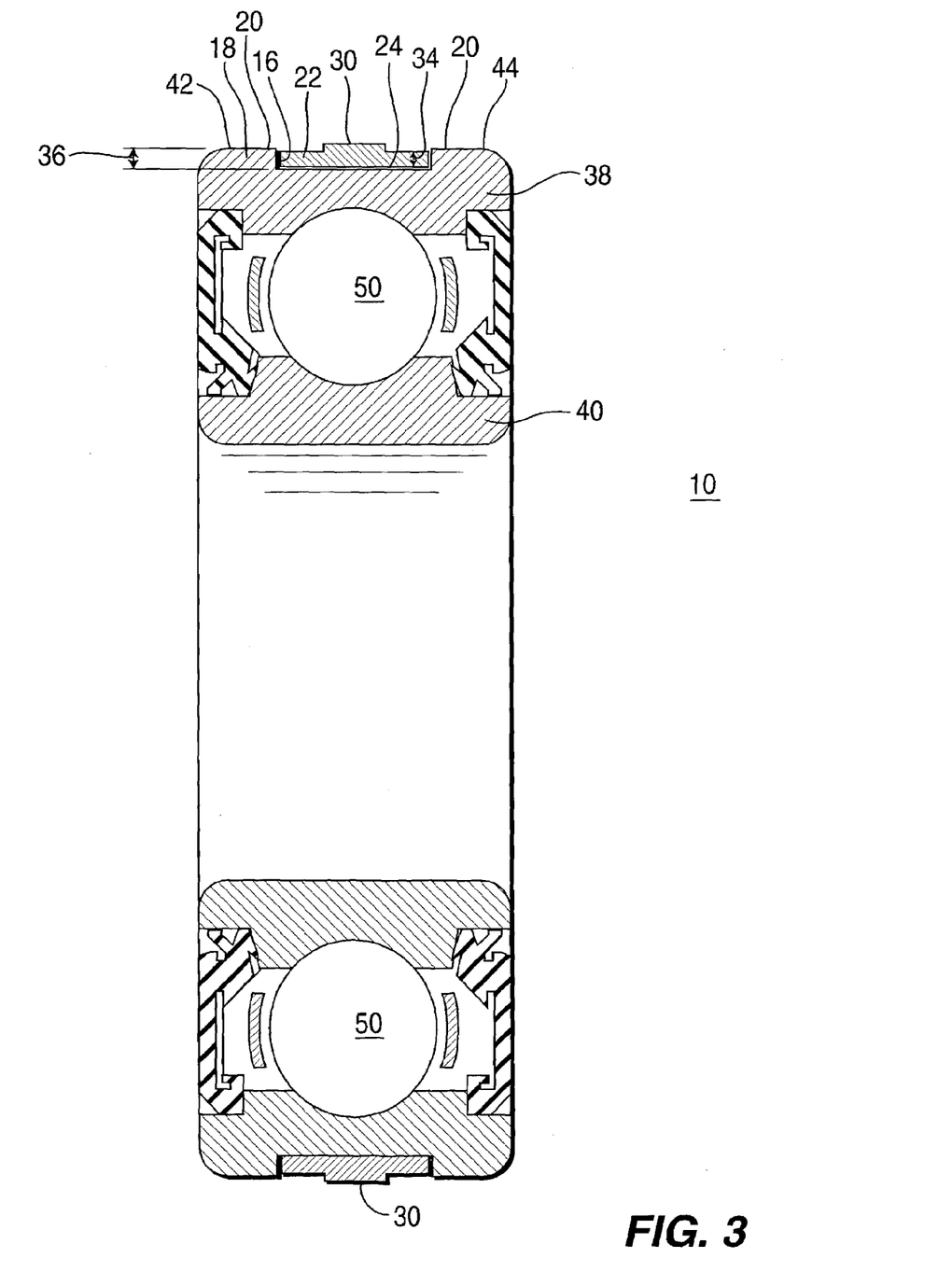
FIG. 3 is a cross-sectional view of the bearing assembly of the present invention.
Figure 4A:
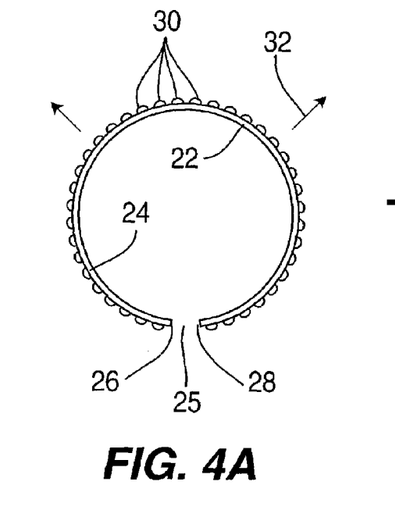
FIG. 4 is a schematic illustration of the method of mounting of the bearing assembly of the present invention within the aperture of a workpiece.
Figure 4B:
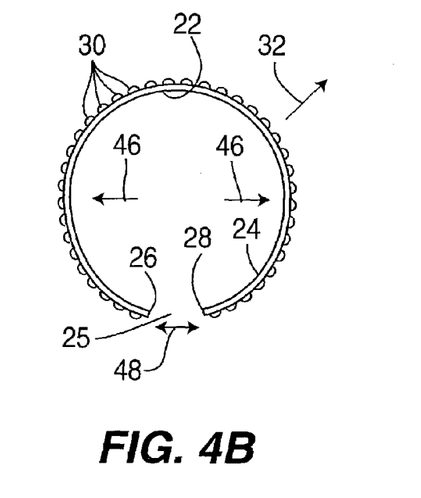
Figure 4C:
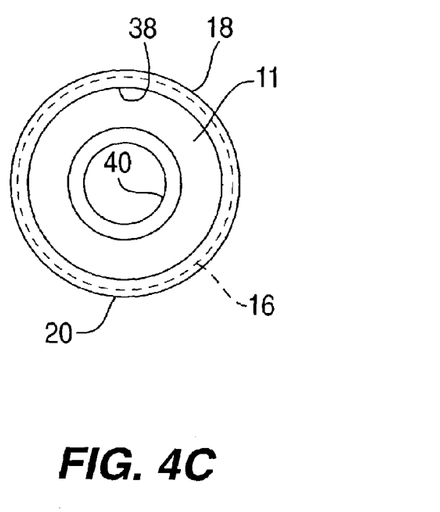
Figure 4D:
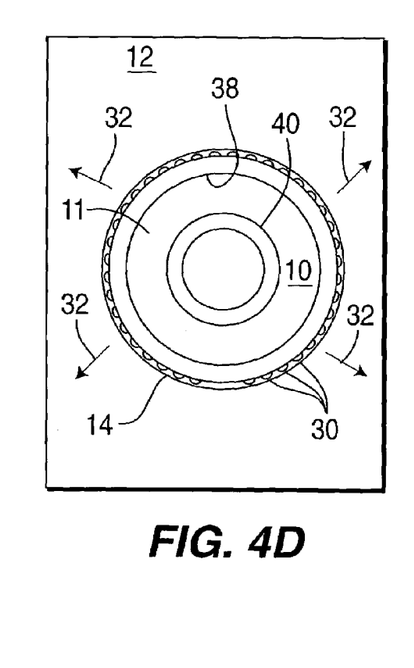

The tolerance ring 22 also includes a plurality of waves 30 which protrude outwardly from the groove 16 when the main band 24 of tolerance ring 22 is positioned therewithin. These protruding waves 30 preferably extend outwardly in a radial direction 32 as shown best in FIG. 4. The thickness 34 of the main band 24 is preferably less than the depth 36 of the groove 16 such that the main band section 24 of the tolerance ring 22 can be contained completely within the groove 16 when the bearing assembly 10 is mounted within the workpiece aperture 14. With this configuration the waves 30 will protrude radially outwardly in the direction shown by arrow 32 toward the body of the workpiece 12 and exert a bias or force against the inside of the workpiece aperture 14 which will maintain the bearing assembly 10 mounted within the workpiece aperture 14. Preferably this position will place the outer bearing race 38 and the inner bearing race 40 concentric with respect to the workpiece aperture 14. This "concentricity" is an important aspect of the present invention in maintaining the proper alignment of rotating parts relative to one another and it is created by the regular spacing of a plurality of protruding waves 30 extending radially outwardly from the main band 24 of the tolerance ring 22 in the radial direction 32 to exert force against the workpiece aperture 14 evenly therearound.

In the preferred configuration the main band 24 will have a main band thickness 34 which is significantly less than the depth 36 of groove 16. Preferably the depth 36 of the groove 16 will be 0.005 inches to 0.010 inches greater than the main band thickness 34. This size difference is important to compensate for variations in the size and shape of the tolerance ring 22 as well as the arcuate convex outer surface 20 of the bearing 11 and to possibly compensate for variations in the shape of the workpiece aperture 14.

When practicing the method of the present invention as schematically illustrated in FIG. 4, initially the tolerance ring 22 is placed in the steady state position as shown in step A of FIG. 4. This figure shows the tolerance ring 22 in the steady state relaxed position with the first end 26 and second end 28 thereof adjacent to one another but somewhat spaced apart. It must be appreciated that the material from which the tolerance ring 22 is formed is a flexibly resilient material such as spring steel. This flexibly resilient material is important for the purpose of providing flexibly resilient force by the protruding waves 30 upon the interior of the workpiece aperture 14. This flexible resilience is also important for allowing the first and second ends 26 and 28 to flex outwardly away from one another to facilitate mounting of the tolerance ring within the circular groove 16.

FIG. 4, step B, shows the first step in the method of affixing the bearing in place wherein force is exerted along force arrows 46 and/or 48. Force exerted along directions 46 is directed on the adjacent portions of the main band 24 in such a manner as to further expand the central opening of the ring-shaped tolerance ring 22 and in this manner separate the first and second ends 26 and 28 from one another significantly. This relationship is shown best in step B of FIG. 4. Another way of expanding the central opening of the tolerance ring 22 can be achieved by exerting force in the direction shown by end force arrows 48. The exertion of force in the direction shown by arrows 48 will also significantly increase the size of the opening within the ring-shaped tolerance ring 22. Once the tolerance ring is forced into the more opened position it can be moved into the groove as schematically illustrated in step C of FIG. 4. That figure shows the bearing 11 ready to receive the tolerance ring 22 for placement into the circular circumferential groove 16 extending therearound.

Once the tolerance ring 22 is in position within the groove the force exerted through arrows 46 and/or 48 can be released which allows the flexibly resilient tolerance ring 22 to return to the steady state position as shown in section A of FIG. 4 in position within the circular groove 16. This assembly can then be inserted as shown in section D of FIG. 4 into the aperture 14 of workpiece 12 such that the bearing assembly 10 can be secured with respect to the workpiece 12 and in particular such that the arcuate convex outer surface 20 of bearing assembly 10 can be firmly retained by the workpiece aperture 14. The force of insertion can be provided by a conventional press or other force exerting device. This force can be exerted against the outer bearing race 38 in the conventional manner or can be exerted against the inner bearing race 40 which is an important advantage of the present invention. Normally exerting force against the inner bearing race 40 is not possible since it will seriously deform the balls or rollers located between the inner bearing race 40 and the outer bearing race 38 which is responsible for allowing relative rotational movement therebetween. However, with the unique method of the present invention which is useful for light duty bearing applications, such force used to press the bearing 11 in place within the workpiece aperture 14 can be applied on the inner bearing race 40 which is much more convenient and easier to maintain concentricity during mounting thereof.

The mounting of the bearing assembly 10 with respect to the workpiece 12 in the workpiece aperture 14 can allow only highly restricted relative movement such that little movement occurs between the arcuate convex outer surface 20 of the bearing assembly 10 and the workpiece 12. With such restricted movable connections often it is best to have the bearing assembly 10 pressed into place utilizing a hydraulic or other similarly powered pressing apparatus. However the present invention has been found to be well adapted to use with light-duty applications wherein some movement is desirable between the bearing assembly 10 and the workpiece 12. This relative movement will be severely limited and will be restricted by a the frictional engagement between the workpiece aperture 14 and the protruding waves 30 of the tolerance ring 22. Thus the tolerance ring 22 can be configured in such a manner that movable mounting of the bearing assembly 10 within the workpiece 12 is possible or a slightly more movable interconnection is also achievable wherein the movement is still somewhat frictionally resisted or restricted thereby requiring some level of force to cause relative movement between the bearing assembly 10 and the workpiece 12. The application where some movement is possible is often referred to as light-duty or limited duty bearing mounting application and is commonly utilized in small appliances such as vacuum cleaners and the like.

As such, the steps of the method of the present invention are set forth in FIG. 4, steps A, B, C and D. It is clearly important to appreciate that the tolerance ring of the present invention must be split in order to practice this method since expansion or opening of the tolerance ring 22 is necessary in order to position it within the groove 16 of the workpiece 12.

An important consideration of the present invention is that the tolerance ring is "self-securing" during assembly. That is, the positioning of the tolerance ring within the circumferential groove 16 defined in the outer body member 18 of bearing 11 is an important advantage especially during such assembly because the tolerance ring 22 will automatically be maintained in the proper position on the arcuate convex outer surface 20 of the bearing 11 at all times during insertion. Often during insertion with conventional tolerance rings positioned about the external surface of conventional bearings it is difficult to maintain the tolerance ring in the correct position extending peripherally around the bearing. With the defining of the groove 16 between the first and second rims 42 and 44 of the outer body member 18 in the bearing assembly 10 of the present invention, the correct relationship between the positioning of the tolerance ring 22 and the bearing 11 will be maintained proper at all times during mounting of the bearing within the workpiece aperture 14. Thus the speed of automated assembly of such bearings into workpieces 12 on an assembly line is significantly expedited.

The configuration of the bearing 11 itself in the present invention can be of any conventional bearing configuration. A conventional bearing is shown in the Figures illustrating the outer bearing race 38, the inner bearing race 40 and the ball means 50 positioned therebetween. This present invention is usable with an inner and outer race rotatable with respect to one another through any conventional bearing design available as of the current time or that might be developed in the future such as ball bearings, pin bearings, roller bearings, friction bearings or any other conceivable bearing interconnection means which would allow an inner and outer race to rotate with respect to one another generically. As such, the unique advantage of the present invention is in the method of assembly and the defining of a groove 16 in the arcuate convex outer surface 20 of a generic bearing 11 and the relative sizing and positioning of the bearing with respect to the workpiece aperture 14 and the tolerance ring 22 which applied directly to light duty uses.

It is important to consider that the present invention is particularly applicable to such light-duty or light force tolerance ring installations. In those installations where frictional movement of the bearing 11 with respect to the workpiece 12 is acceptable or even desired, it is often difficult to maintain the tolerance ring in a proper position during mounting since the forces exerted on the tolerance ring 22 and exerted by the tolerance ring 22 are minimal in order to allow the frictional movement of the light-duty bearing mounting system. The present invention overcomes the difficulty of retaining the tolerance ring in proper position even after placement within the workpiece aperture 14 by the unique method of the present invention wherein the arcuate outer surface of the bearing includes a groove for holding the tolerance ring and the tolerance ring includes a main band section which is capable of being completely captured within that groove. This alignment can also be better maintained since the present invention is designed for mounting of the bearing 11 within the workpiece aperture 14 by allowing the exerting of the pressing forces required for insertion against the inner bearing race 40 axially.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A method for mounting a light duty bearing within a workpiece aperture to be frictionally movable therewithin comprising:

A. providing a bearing having an arcuate convex outer surface defining a groove extending circumferentially therearound and an inner race member rotatably movable with respect to the arcuate convex outer surface;

B. providing a tolerance ring of flexibly resilient metallic material including a main band section being ring-shaped and including a plurality of wave protrusions extending radially outwardly therefrom and being split laterally to define first and second longitudinal ends thereon;

C. exerting force on the tolerance ring to urge the first longitudinal end and the second longitudinal end thereof apart to further open the ring-shaped main band section thereof;

D. positioning of the tolerance ring into the groove defined in the arcuate convex outer surface of the bearing;

E. ceasing the exerting of force on the tolerance ring to allow the first and the second longitudinal ends thereof to resiliently move toward each other in order to allow the main band section to return to the steady state flexibly resilient configuration thereof while positioned the groove to facilitate retaining therewithin with the wave protrusions extending radially outwardly therefrom; and     F. placing of the bearing with the flexibly resilient tolerance ring positioned within the groove defined therein with the wave protrusions thereof extending radially outwardly therefrom into abutting engagement with the aperture of the workpiece for exerting bias thereagainst sufficiently to allow a frictionally movable mounting of the bearing therewithin.

2. A method for mounting a light duty bearing within a workpiece aperture to be frictionally movable therewithin as defined in claim 1 wherein the bearing is provided with an arcuate convex outer surface which is cylindrically-shaped and defines a groove therein which is circular.

3. A method for mounting a light duty bearing within a workpiece aperture to be frictionally movable therewithin as defined in claim 1 wherein the bearing is provided with an inner race member rotatably mounted within an outer race member with the arcuate convex outer surface being defined on the outer race member.

4. A method for mounting a light duty bearing within a workpiece aperture to be frictionally movable therewithin as defined in claim 3 wherein the groove is defined within the outer race member for facilitating retaining of the tolerance ring therewithin.

5. A method for mounting a light duty bearing within a workpiece aperture to be frictionally movable therewithin as defined in claim 1 wherein the main band section of the tolerance ring is provided with a thickness not greater than the depth of the circumferential groove defined in the arcuate convex outer surface to facilitate retaining of the main band section completely within the circumferential groove responsive to positioning of the tolerance ring into the groove.

6. A method for mounting a light duty bearing within a workpiece aperture to be frictionally movable therewithin as defined in claim 5 wherein the main band section of the tolerance ring is provided with a thickness of between 0.005 inches and 0.010 inches less than the depth of the circumferential groove defined in the arcuate convex outer surface to facilitate retaining of the main band section completely within the circumferential groove responsive to positioning of the tolerance ring into the groove and to compensate for dimensional variations in the size and shape of the tolerance ring to assure retainment thereof completely within the circumferential groove.

7. A method for mounting a light duty bearing within a workpiece aperture to be frictionally movable therewithin as defined in claim 5 wherein the wave protrusions extend radially outwardly from the tolerance ring sufficiently when positioned within the circumferential groove to extend out of the circumferential groove and beyond the arcuate convex outer surface of the bearing for abutting engagement thereof with respect to the workpiece aperture for facilitating frictionally movable mounting of the bearing with respect to the aperture in the workpiece.

8. A method for mounting a light duty bearing within a workpiece aperture to be frictionally movable therewithin as defined in claim 1 wherein the first longitudinal end and the second longitudinal end of the tolerance ring are positioned immediately adjacent to one another within the circumferential groove responsive to ceasing the exerting of force on the tolerance ring.

9. A method for mounting a light duty bearing within a workpiece aperture to be frictionally movable therewithin as defined in claim 1 wherein the first longitudinal end and the second longitudinal end of the tolerance ring are positioned in abutment with respect to each another when positioned within the circumferential groove responsive to ceasing the exerting of force on the tolerance ring.

10. A method for mounting a light duty bearing within a workpiece aperture to be frictionally movable therewithin as defined in claim 1 wherein said exerting force on the tolerance ring is performed directly upon the first longitudinal end and the second longitudinal end thereof to urge more separation therebetween to facilitate spreading and opening of the tolerance ring for facilitating said placing of the bearing within the groove.

11. A method for mounting a light duty bearing within a workpiece aperture to be frictionally movable therewithin as defined in claim 1 wherein the bearing is provided with a first rim on one side of the groove and a second rim on the opposite side of the groove to facilitate retaining of the tolerance ring therewithin.

12. A method for mounting a light duty bearing within a workpiece aperture to be frictionally movable therewithin as defined in claim 1 wherein the bearing is provided with a single groove which extends laterally across the arcuate convex outer surface to a dimension greater than 50% of the total lateral dimension of the ring-shaped main band section to facilitate retaining the tolerance ring therewithin.

13. A method for mounting a light duty bearing within a workpiece aperture to be frictionally movable therewithin as defined in claim 1 wherein said placing of the bearing with the flexibly resilient tolerance ring positioned within the groove defined therein with the wave protrusions thereof extending radially outwardly therefrom into the workpiece is performed by pressing of the bearing into the aperture of the workpiece with the arcuate outer surface thereof into direct abutment with respect to the workpiece for facilitating fixed securement therebetween.

14. A method for mounting a light duty bearing within a workpiece aperture to be frictionally movable therewithin as defined in claim 13 wherein said pressing of the bearing is performed by exerting force against the inner race to urge the bearing into frictionally movable mounting within the workpiece aperture.

15. A method for mounting a light duty bearing within a workpiece aperture to be frictionally movable therewithin comprising:

A. providing a bearing with an inner race member rotatably mounted within an outer race member having an arcuate convex outer surface being generally cylindrically-shaped and further defining a generally circular groove extending circumferentially therearound; with respect to the arcuate convex outer surface;

B. providing a tolerance ring of flexibly resilient metallic material including a main band section being ring-shaped and including a plurality of wave protrusions extending radially outwardly therefrom and being split laterally to define first and second longitudinal ends thereon and wherein the main band section of the tolerance ring is of a thickness not greater than the depth of the circumferential groove to facilitate retaining of the main band section completely within the circumferential groove responsive to positioning of the tolerance ring thereinto;

C. exerting force on the tolerance ring to urge the first longitudinal end and the second longitudinal end thereof apart to further open the ring-shaped main band section thereof;

D. positioning of the tolerance ring completely within the groove defined in the arcuate convex outer surface of the bearing with the wave protrusions extending outwardly radially therefrom;

E. ceasing the exerting of force on the tolerance ring to allow the first and the second longitudinal ends thereof to resiliently move toward each other to allow the main band section to return to the steady state flexibly resilient configuration with the first and second longitudinal ends positioned adjacent to one another while positioned the groove to facilitate retaining therewithin with the wave protrusions extending radially outwardly therefrom; and F. placing of the bearing by pressing thereof with the flexibly resilient tolerance ring positioned within the groove defined therein with the wave protrusions thereof extending radially outwardly therefrom into abutting engagement with the aperture of the workpiece for exerting bias thereagainst sufficiently to allow a frictionally movable mounting of the bearing therewithin.

* * * * *